United States Patent
Jang et al.

(10) Patent No.: US 7,428,240 B2
(45) Date of Patent: Sep. 23, 2008

(54) DATA COMMUNICATIONS METHOD USING BACKOFF NUMBER CONTROL

(75) Inventors: Kyung-hun Jang, Suwon (KR); Woo-shik Kang, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1099 days.

(21) Appl. No.: 10/247,482

(22) Filed: Sep. 20, 2002

(65) Prior Publication Data
US 2003/0053480 A1  Mar. 20, 2003

(30) Foreign Application Priority Data
Sep. 20, 2001  (KR) .............................. 2001-58361

(51) Int. Cl.
 *H04L 12/413* (2006.01)
(52) U.S. Cl. ..................... 370/447; 370/329; 370/445
(58) Field of Classification Search ................. 370/329, 370/445, 447
See application file for complete search history.

(56) References Cited

U.S. PATENT DOCUMENTS

| 5,761,446 | A | * | 6/1998 | Donley et al. ............... 710/107 |
| 5,940,399 | A | | 8/1999 | Weizman |
| 6,813,260 | B1 | * | 11/2004 | Fogle .......................... 370/338 |
| 7,027,461 | B1 | * | 4/2006 | Bontempi .................... 370/443 |
| 2007/0121529 | A1 | * | 5/2007 | Meier .......................... 370/256 |

FOREIGN PATENT DOCUMENTS

| EP | 0 483 546 | 5/1992 |
| EP | 0 652 523 | 5/1995 |
| EP | 0 994 604 | 4/2000 |
| JP | 59-055658 | 3/1984 |
| JP | 4-181837 | 6/1992 |
| JP | 11-355291 | 12/1999 |

OTHER PUBLICATIONS

Deng, et al., "A Priority Scheme for IEEE 802.11 DCF Access Method", IEICE Transactions on Communications, Institute of Electronics Information and Comm. Eng., Tokyo, JP, vol. E82-B, No. 1, pp. 96-102 (Jan. 1999) [XP000927880].

* cited by examiner

*Primary Examiner*—Firmin Backer
*Assistant Examiner*—Jason Mattis
(74) *Attorney, Agent, or Firm*—Lee & Morse, P.C.

(57) ABSTRACT

A method for transmitting data in a centralized data communications system having an access point and a plurality of stations using a carrier sense multiplexing access (CSMA) method using a backoff number control preferably includes (a) receiving a multi-poll message containing backoff numbers to be assigned to each station by the access point; (b) setting the backoff numbers of the multi-poll message to the backoff numbers of the stations; and (c) counting down the set backoff numbers and transmitting data. Each station that desires polling registers a station ID and a polling cycle, sets a backoff number contained in a multi-poll message, counts the backoff number, and if the backoff number becomes zero, transmits data such that contention between stations is prevented.

14 Claims, 7 Drawing Sheets

FIG. 1 (PRIOR ART)

↓    DATA GENERATING TIME

③, ⑤    RANDOMLY GENERATED BACKOFF NUMBERS

▨    DATA BEING TRANSMITTED

| THE NUMBER OF STATIONS DESIRED TO BE POLLED ||
|---|---|
| STATION ID | BACKOFF NUMBER |
| STATION ID | BACKOFF NUMBER |
| ⋮ | ⋮ |
| STATION ID | BACKOFF NUMBER |

DATA COMMUNICATIONS METHOD USING BACKOFF NUMBER CONTROL

BACKGROUND OF THE INVENTION

1. Field of the Invention

The present invention relates to a centralized data transmission method using a carrier sense multiplexing access (CSMA) method. More particularly, the present invention relates to a data transmission method in which an access point transmits data by transmitting a multi-poll message using the CSMA method.

2. Description of the Related Art

Figure 1:
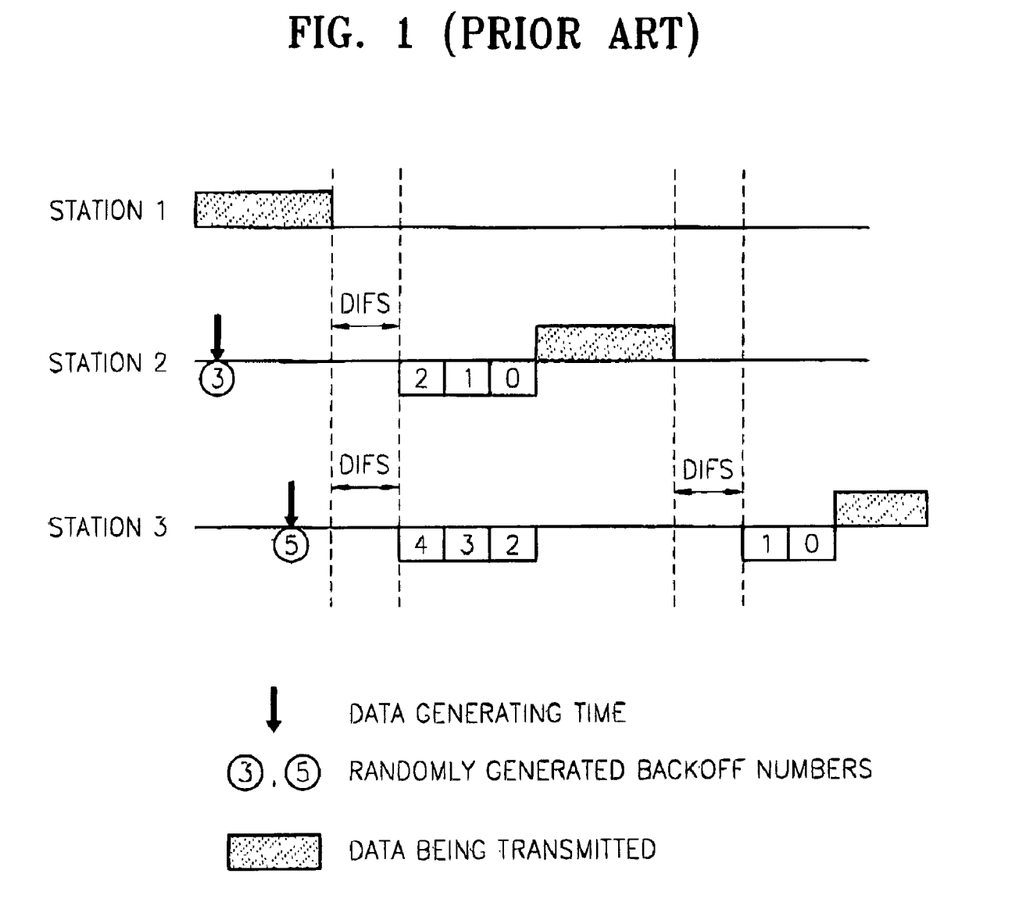
FIG. 1 illustrates a timing diagram for a conventional approach for transmitting data using distributed coordination function (DCF) method for centralized data communications using a carrier sense multiplexing access (CSMA) method according to the prior art.

FIG. 1 illustrates a timing diagram for a conventional approach for transmitting data using a distributed coordination function (DCF) method for centralized data communications using a carrier sense multiplexing access (CSMA) method according to the prior art.

In a CSMA centralized data communications system using a wireless LAN system, such as one based on IEEE 802.11, in order to minimize contention, each station generates a random backoff number. If the channel is idle longer than a predetermined time (DCF Inter Frame Space, DIFS), the station successively decreases the backoff number, until it reaches zero (0), at which time the station transmits data. This is referred to as a DCF method. Here, the backoff number is a randomly generated number between a minimum value (CWmin) and a maximum value (CWmax) of a contention window (CW) determined by an access point.

Referring to the example shown in FIG. 1, station 1 transmits data and the backoff numbers of station 2 and station 3 are three (3) and five (5), respectively. One DIFS after station 1 ends data transmission, the backoff number of station 2 is counted down, and data is transmitted. While data of station 2 is being transmitted, counting down of the backoff number of station 3 is stopped. One DIFS after station 2 has ended data transmission, the backoff number of station 3 is counted down, and when the backoff number reaches zero (0), data is transmitted.

Since the DCF method works on a probability basis, there is a high possibility of contention between data transmitted by stations. Additionally, since the access points do not typically control the number and size of data packets, it is difficult to support time-limited services.

Figure 2:
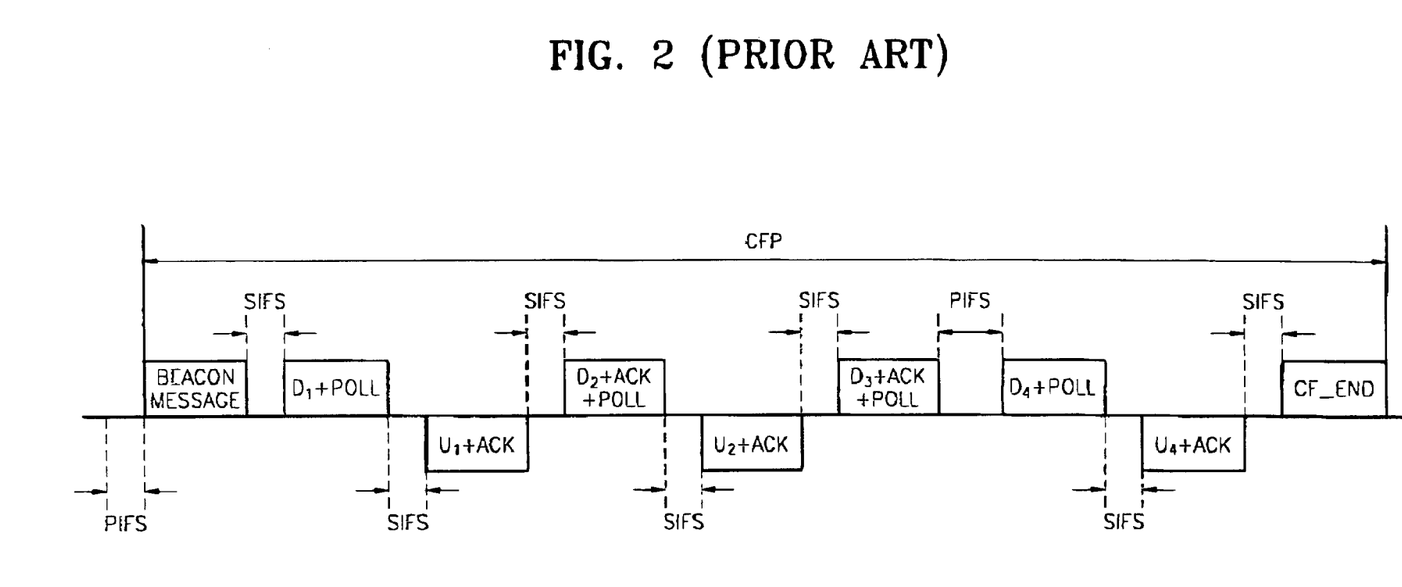
FIG. 2 illustrates a timing diagram for a conventional data transmission method for polling with a point coordination function (PCF) in conventional centralized data communications using the CSMA method according to the prior art.

FIG. 2 illustrates a timing diagram for a conventional data transmission method using a point coordination function (PCF), in which a contention free period (CFP), which can be controlled by an access point, is set, and transmission opportunities are provided to each station based on a polling method. This is referred to as a point coordination function (PCF) method. In the PCF method, a PCF Inter Frame Space (PIFS) and a Short Inter Frame Space (SIFS), which are shorter than the DIFS, are used instead of the DIFS in order to obtain priority over DCF-using stations. However, in wireless LAN systems, for example, Intersil and ATmel, the PCF function is not offered due to the complexity of implementation.

Figure 3:
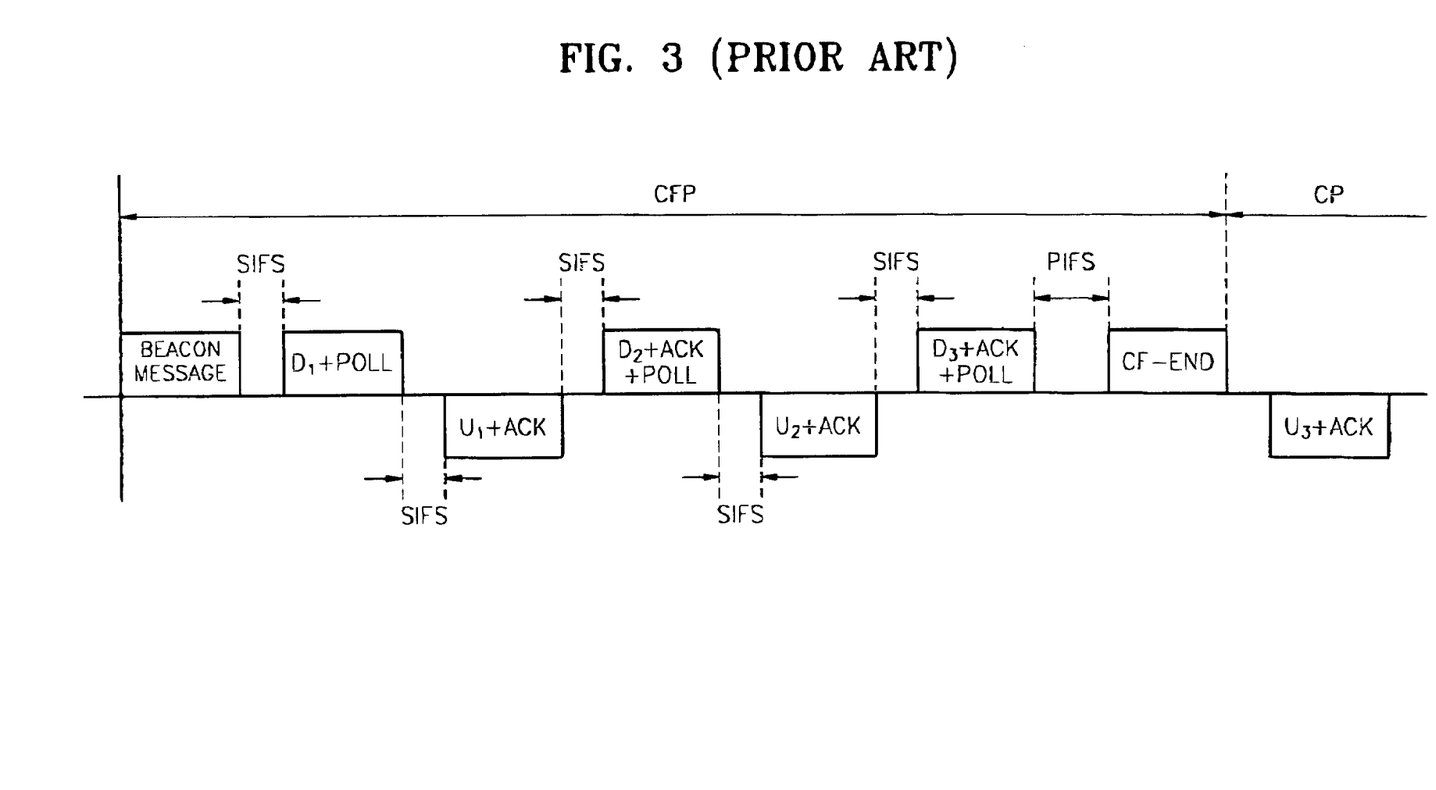
FIG. 3 illustrates a timing diagram for a conventional data transmission method in which contention period (CP) intervals and contention free period (CFP) intervals are mixed and used together according to the prior art.

FIG. 3 illustrates a timing diagram for a conventional data transmission method of a centralized data communications system using the CSMA of FIG. 1, but wherein contention period (CP) intervals and contention free period (CFP) intervals are mixed and used together. A leading beacon message may contain information on CFP intervals or CP intervals, or beacon message intervals. One SIFS interval after one station ends data transmission, an access point transmits a polling message (D1+Poll, D2+ack+Poll, D3+ack+Poll). The polling messages are transmitted to the stations from the access point. The stations that receive the polling messages transmit data and a confirmation message to confirm the transmission of the data to the access point.

The DCF method is used during the CP interval, while the PCF method is used during the CFP interval. Since the DCF method depends on obtaining transmission opportunities based on probability, it is difficult to support time-limited services. However, use of polling stations using the PCF method during the CFP interval does allow for time-limited services, but requires that a polling message be transmitted thereby further requiring additional timing management for the CFP intervals. Thus, implementation is complicated.

In addition, since the CFP interval is typically fixed, data transmitted by a polled station may exceed the CFP interval. In this case, the station has to give up the PCF transmission, and transmit the remaining data fragment in a CP interval on a contention basis. For example, when stations that received polling messages transmit data and a confirmation message (U1+ack, U2+ack or U3+ack) to confirm the transmission of data, a station that desires to transmit U3 data cannot transmit the data in the CFP interval and has to transmit the data in the CP interval.

If a polled station is to transmit continuous fragmented data, it may be necessary to adjust the lengths of a transmission frame and a CFP interval in order to practically support time-limited services. For some services, if very short interval polling is requested, polling in the CP interval, as well as polling in the CFP interval, may be needed. To solve this, the length of a transmission frame should be shorter than a corresponding polling cycle interval.

SUMMARY OF THE INVENTION

In an effort to solve the above problems, it is a first feature of an embodiment of the present invention to provide a data transmission method using a backoff number control in a CSMA centralized data communications system.

It is a second feature of an embodiment of the present invention to provide a computer readable recording medium having the data transmission method therein.

To provide the first feature of an embodiment of the present invention, there is provided a data transmission method using a backoff number control in a centralized data communications system, which includes an access point and a plurality of stations, the method including (a) receiving a multi-poll message containing backoff numbers to be assigned to each station by the access point; (b) setting the backoff numbers of the multi-poll message to the backoff numbers of the stations; and (c) counting down the set backoff numbers, preferably to zero, before transmitting data from one of the plurality of stations. The method may further include allowing any station that has data to transmit to request a transmission time slot from an access point by registering IDs and polling cycles with that access point. Upon receipt of the request, the access point generates the multi-poll message that contains at least one of the number of stations to be polled, the station IDs, or backoff numbers of the stations.

Each station to be polled monitors the multi-poll message and determines if the associated station ID is included, and if so, extracts the appropriate backoff number from the message and sets that value as the backoff number for the station. The method preferably further includes setting for a station having no data to be transmitted, and/or not waiting for a transmission opportunity, a minimum value from the range of random values from which backoff numbers are generated to be equal to the number of stations to be polled. Alternatively, a transmission opportunity may be derived by resetting the backoff number to a value obtained by adding the current number of stations to be polled to a randomly generated backoff number in a station that is not among the stations to be polled.

BRIEF DESCRIPTION OF THE DRAWINGS

The above and other features and advantages of the present invention will become more apparent upon review of a detailed description of preferred embodiments thereof with reference to the attached drawings in which.

DETAILED DESCRIPTION OF THE INVENTION

Korean Patent Application No. 2001-58361, filed Sep. 20, 2001, and entitled: "Data Communications Method Using Backoff Number Control," is incorporated by reference herein in its entirety.

Figure 4:
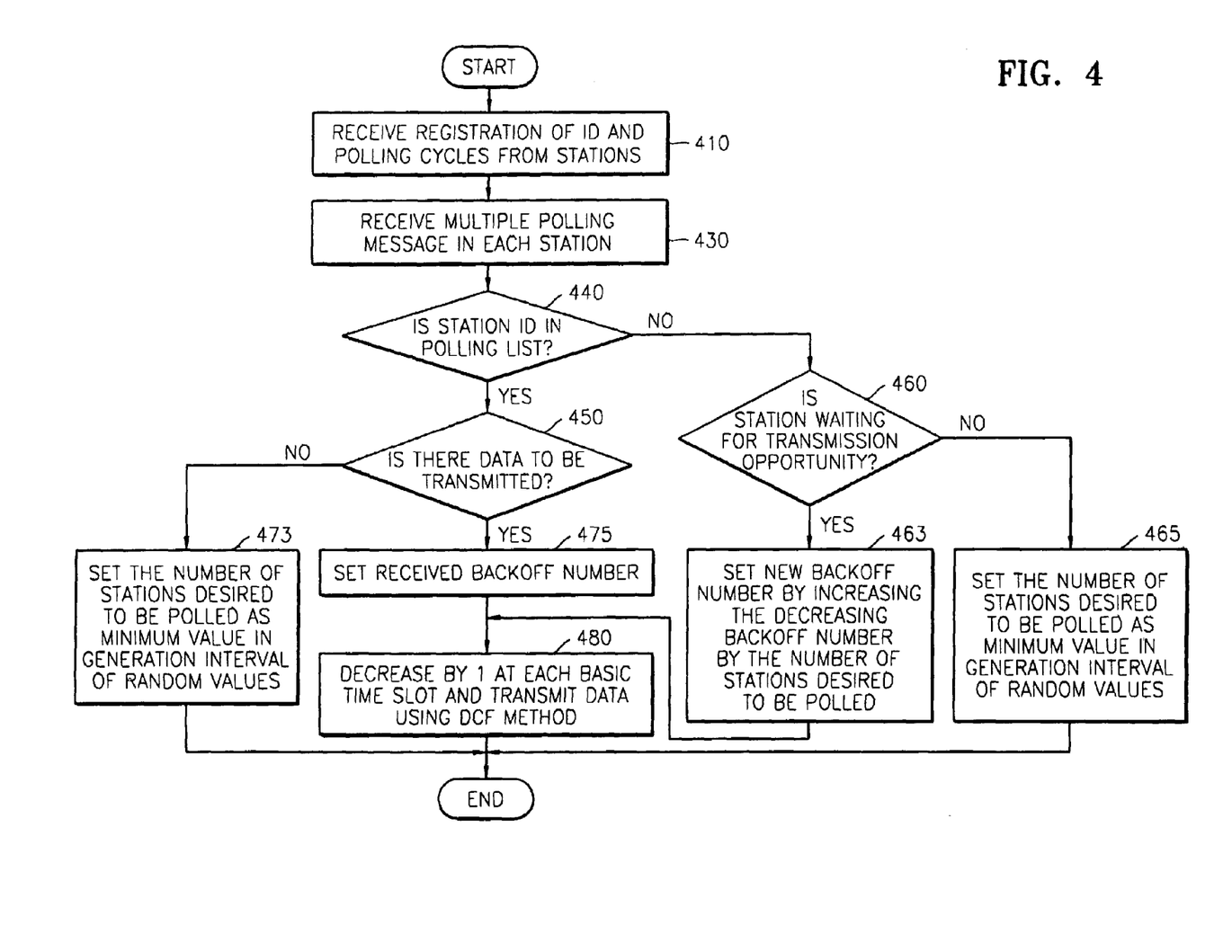
FIG. 4 illustrates a flowchart showing a data transmission method using a backoff number control mechanism according to the present invention.

FIG. 4 illustrates a flowchart showing a data transmission method using a backoff number control mechanism in a CSMA centralized data communications system according to an embodiment of the present invention. In this embodiment, an access point preferably transmits a multi-poll message to a plurality of stations, each of which receives the message, sets a unique backoff number contained therein, and transmits data according to that backoff number.

Initially, in step 410, each station transmits registration information containing a station ID and a polling cycle to the access point. The access point calculates the lengths of transmission frames based on the registered polling cycles and randomly generates a unique backoff number for each station. Here, assuming that the interval of random values is within a contention window (CW), the access point sets the backoff numbers. From the information registered in step 410, the access point generates and transmits a multi-poll message containing the number of stations that are to be polled, the IDs of those stations, and/or the unique backoff numbers to be assigned to those stations.

In step 430, each station receives the multi-poll message transmitted by the access point. In step 440, each station checks the multi-poll message for an associated station ID and, in step 450, determines if the station has data to be transmitted. If both of those conditions are met, in step 475, the station sets the unique backoff number extracted from the multi-poll message that corresponds to the ID of the station in order to prepare to transmit data. In step 480, the station then transmits the data using the DCF method by decrementing the backoff number at each basic time slot.

If, however, it is determined in step 450 for any station that uses polling that there is no data to be transmitted, that station is set to a minimum number of stations desired to be polled in the contention window in step 473 and will remain in that condition until such time that there is data to be transmitted, and a new backoff number can be randomly generated between the minimum value and the maximum value of the Contention Window by the access point.

If it is determined that the ID of the station is not in the polling list of the received multi-poll message in step 440, but that the station is waiting to obtain a transmission opportunity in step 460, the backoff number is increased by a number of corresponding to the number of stations that are to be polled, and a new backoff number is set in step 463. By decreasing the new backoff number by one (1) at each basic time slot, data is then transmitted using the DCF method in step 480 when the backoff number reaches zero (0).

If it is determined, in step 440, that for any station that uses polling that the ID of the station is not in the polling list of the received multi-poll message and the station is not waiting to obtain a transmission opportunity in step 460, the number of stations desired to be polled is set as the minimum value in the contention window in step 465. At such time that there is data to be transmitted, a new backup number will be generated and transmitted by the access point. If two stations desire to poll simultaneously, each of the two stations set a different backoff number. The backoff number is determined by a predetermined scheduling algorithm.

Figure 5:
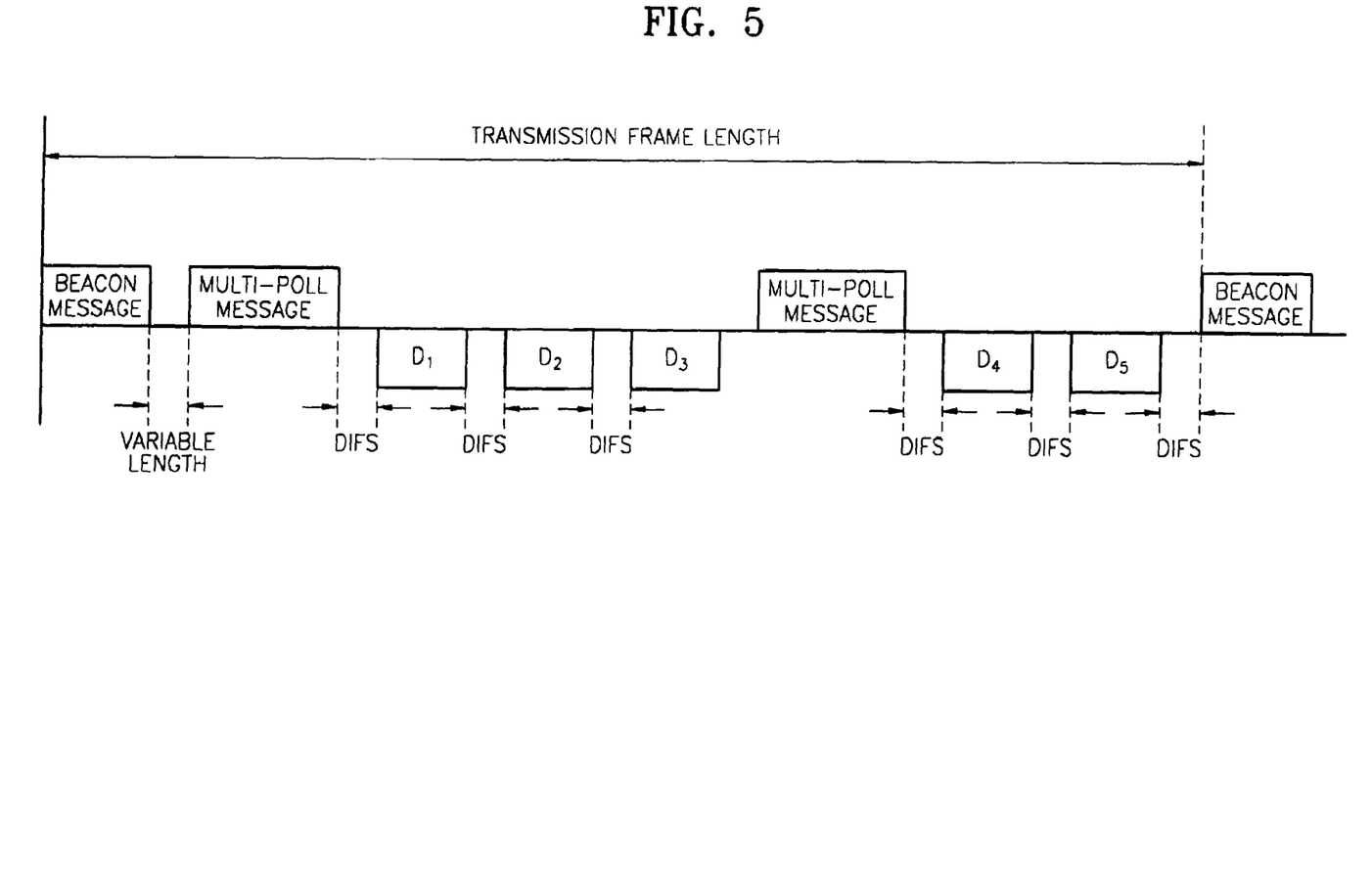
FIG. 5 illustrates a timing diagram of a data transmission frame for a data transmission method using a backoff number control according to the present invention.

FIG. 5 illustrates a timing diagram of a data transmission frame for a data transmission method using a backoff number control according to the present invention. A transmission frame is preferably formed with beacon message information containing the interval of CP or the interval of a beacon message transmitted by the access point, a multi-poll message, and data transmitted by each station. The time interval between a beacon message and a multi-poll message may be variable, and the time interval for transmitting each data (D1 through D5) is preferably a DIFS. The time when a polling message is transmitted is preferably variable, because the polling cycle registered by each station is confirmed and according to the cycle, the polling message is transmitted. Additionally, since a plurality of multi-poll messages can be transmitted in one transmission frame interval (length), the polling interval is also preferably variable.

Figure 6:
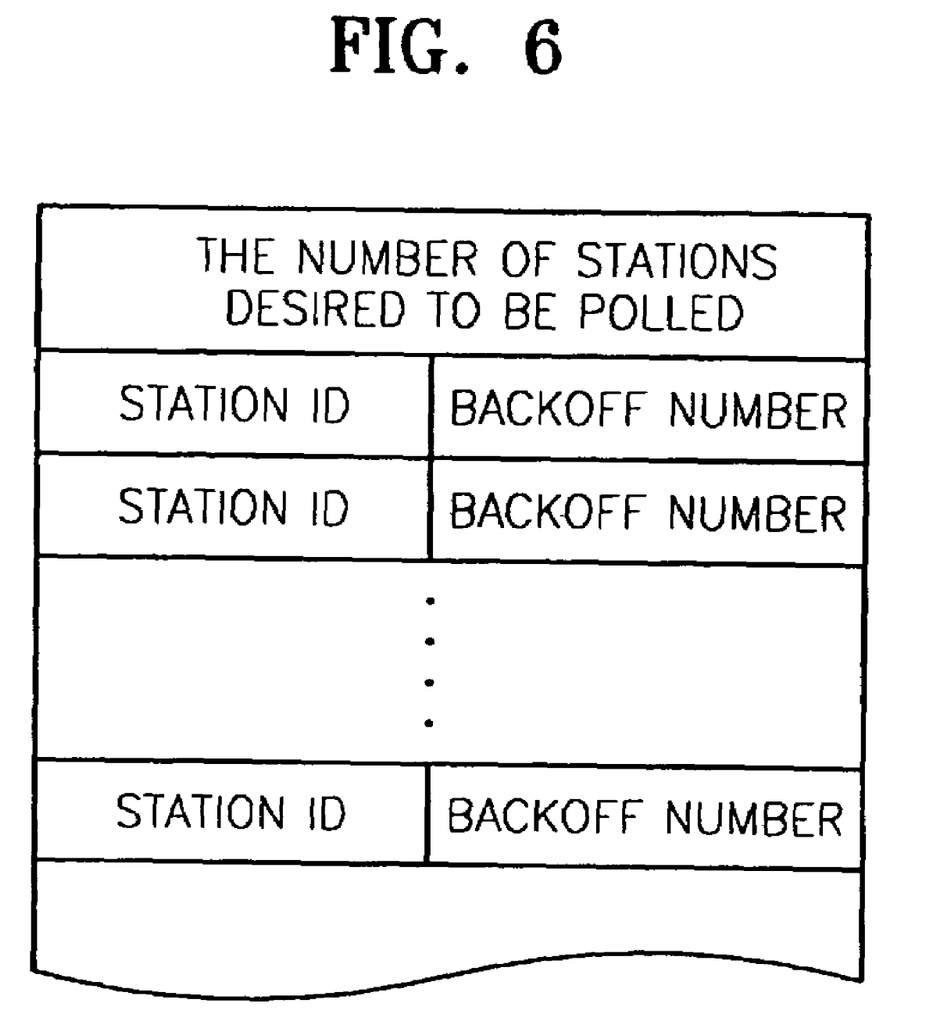
FIG. 6 illustrates an exemplary table showing unique backoff numbers for each listed station.

FIG. 6 illustrates an exemplary table showing a listing of a unique backoff numbers with an associated station to be polled, i.e. the ID and backoff number of each station are included. If the access point transmits a multi-polling message having the structure shown in FIG. 6 during an interval which is shorter than a DIFS, after a beacon message is transmitted, each station sets a backoff number corresponding to the ID of the station, and then transmits data in a DIFS interval.

Figure 7:
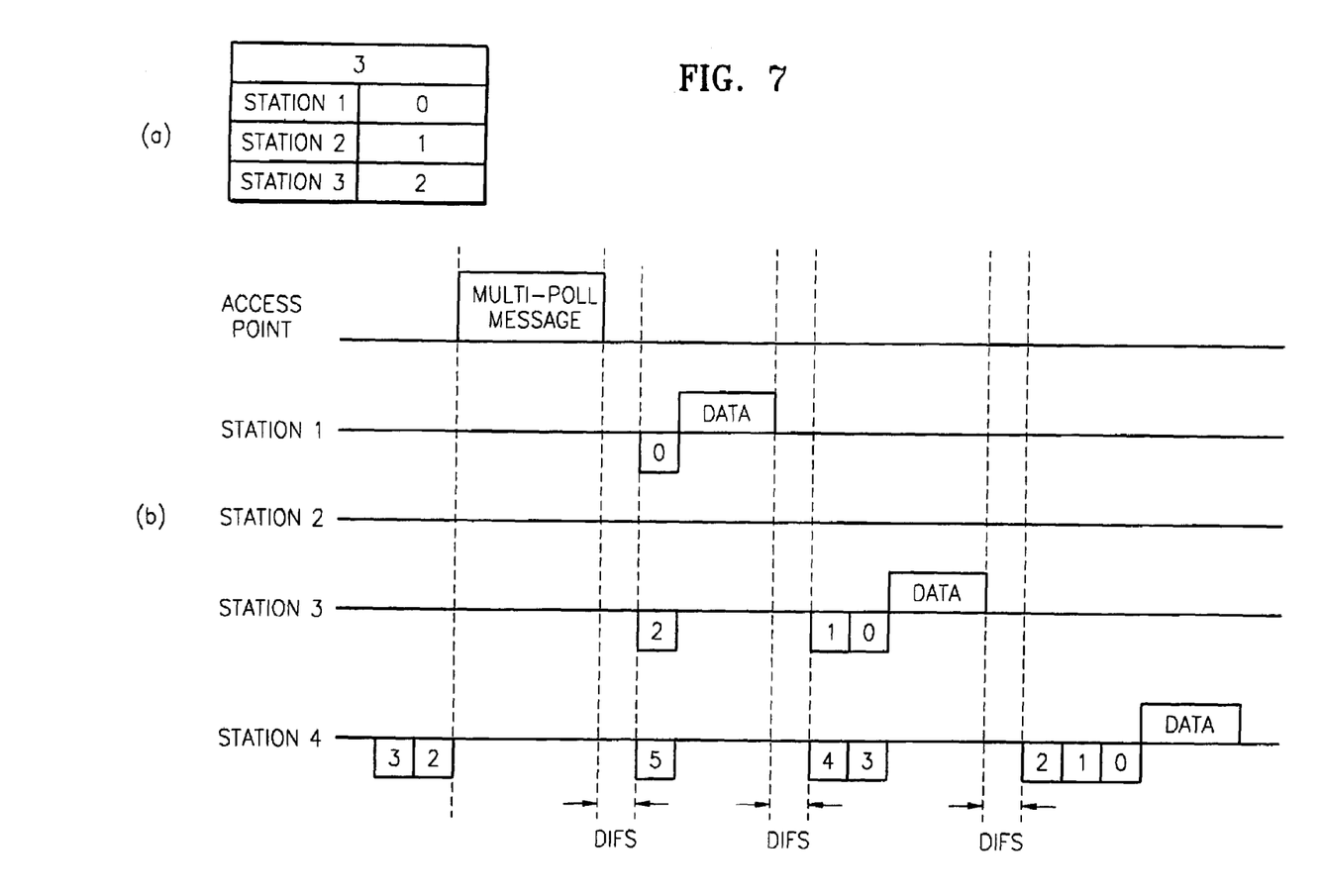
FIGS. 7a and 7b illustrate a station table and an associated timing diagram for a preferred embodiment of a data transmission method using a backoff number control according to the present invention.

FIG. 7a illustrates a station table, similar to the listing shown in FIG. 6, of a preferred embodiment of the present invention. Since the number of stations that want polling is an exemplary three (3), backoff numbers zero (0), one (1), and two (2) are assigned to stations 1, 2, and 3, respectively.

FIG. 7b illustrates a timing diagram of an exemplary data transmission of a multi-poll message, followed by associated data transmissions from the polled stations according to the present invention.

Referring to FIGS. 7a and 7b, if an access point transmits a multi-poll message as shown in FIG. 7a, stations 1 through 4 receive the multi-poll message, check registered IDs and backoff numbers, set assigned backoff numbers and then transmit data when the set backup number reaches zero.

For example, since the backoff number of station 1 is zero (0) as shown in the table in FIG. 7a, station 1 may have a transmission opportunity immediately after receiving the multi-poll message. If the channel becomes idle a DIFS interval after station 1 ends data transmission, stations excluding station 1 decrease backoff numbers by one (1) at each basic time slot. Therefore, station 2, which decrements the backoff number thereof from one (1) to zero (0) obtains a transmission opportunity. However, since in this example station 2 has no data to be transmitted, the channel is still idle. Since the channel is also idle for a basic time slot at this time, stations excluding stations 1 and 2 decrease the backoff numbers by one (1). Thus, station 3 obtains the next transmission opportunity. Since station 4 was not in the polling list, it increased its backoff number to the number of stations that require polling (i.e. three (3) stations,) and when the multi-poll message is received, station 4 cannot obtain a transmission opportunity in the polling cycle. Here, the polling cycle indicates the interval between multi-poll messages.

Thus, the access point can always perform polling of the stations such that time-limited services may be effectively supported.

The present invention may be embodied in a code, which may be read by a computer, on a computer readable recording medium. The computer readable recording medium may include a plurality of recording apparatuses on which computer readable data are stored, such as magnetic storage media (e.g., ROM's, floppy disks, hard disks, etc.), optically readable media (e.g., CD-ROMs, DVDs, etc.) and carrier waves (e.g., transmissions over the Internet). The computer readable recording media may also be distributed among computer systems connected through a network and can may store and execute a computer readable code in a distributed mode. Additionally, the structure of data or a database required in performing the method according to the present invention may be recorded in the recording medium as described above and by operating the computer program, desired functions and effects may be obtained.

According to the present invention as described above, the data transmission method using a backoff number control in a CSMA centralized data communications system is applied for controlling media access of a wireless LAN or Home PNA such that time-limited services can be supported. Further, with simple implementation, the method may be easily applied to existing systems such that the method can support real time service in low priced systems.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A data transmission method using a backoff number control in a centralized data communications system, which includes an access point and a plurality of stations, comprising:
    (a) receiving a multi-poll message containing backoff numbers to be assigned to each station by the access point;
    (b) determining at each station if a station ID corresponding to that station is identified in the multi-poll message;
    (c) setting the backoff numbers of the stations to the corresponding backoff numbers assigned by the multi-poll message;
    (d) counting down the set backoff numbers before transmitting data from one of the plurality of stations; and
    (e) resetting the backoff number to a value obtained by adding the current number of stations identified in the multi-poll message to a randomly generated backoff number in a station that is not among the identified stations.

2. The method as claimed in claim 1, further comprising: registering IDs and polling cycles of the stations to be polled at the access point.

3. The method as claimed in claim 1, wherein in (a) the multi-poll message contains at least one of the number of stations to be polled, the station IDs, or backoff numbers of the stations.

4. The method as claimed in claim 3, wherein in (c) each station to be polled checks the IDs of stations in the multi-poll message and sets a backoff number corresponding to the respective station.

5. The method as claimed in claim 1, wherein in (d) the set backoff number is counted down and when the backoff number becomes zero, data is transmitted.

6. The method as claimed in claim 1, further comprising: setting the number of stations to be polled as the minimum value in the range of random values for generating backoff numbers if there is a station having no data to be transmitted among the stations to be polled.

7. The method as claimed in claim 1, further comprising: setting the number of stations to be polled as the minimum value in a range of random values to be generated if there is no station waiting to obtain the transmission opportunity by randomly setting the backoff number.

8. A computer readable medium having embodied thereon a computer program for the method of claim 1.

9. A computer readable medium having embodied thereon a computer program for the method of claim 2.

10. A computer readable medium having embodied thereon a computer program for the method of claim 3.

11. A computer readable medium having embodied thereon a computer program for the method of claim 4.

12. A computer readable medium having embodied thereon a computer program for the method of claim 5.

13. A computer readable medium having embodied thereon a computer program for the method of claim 6.

14. A computer readable medium having embodied thereon a computer program for the method of claim 7.

* * * * *